Patented May 16, 1939

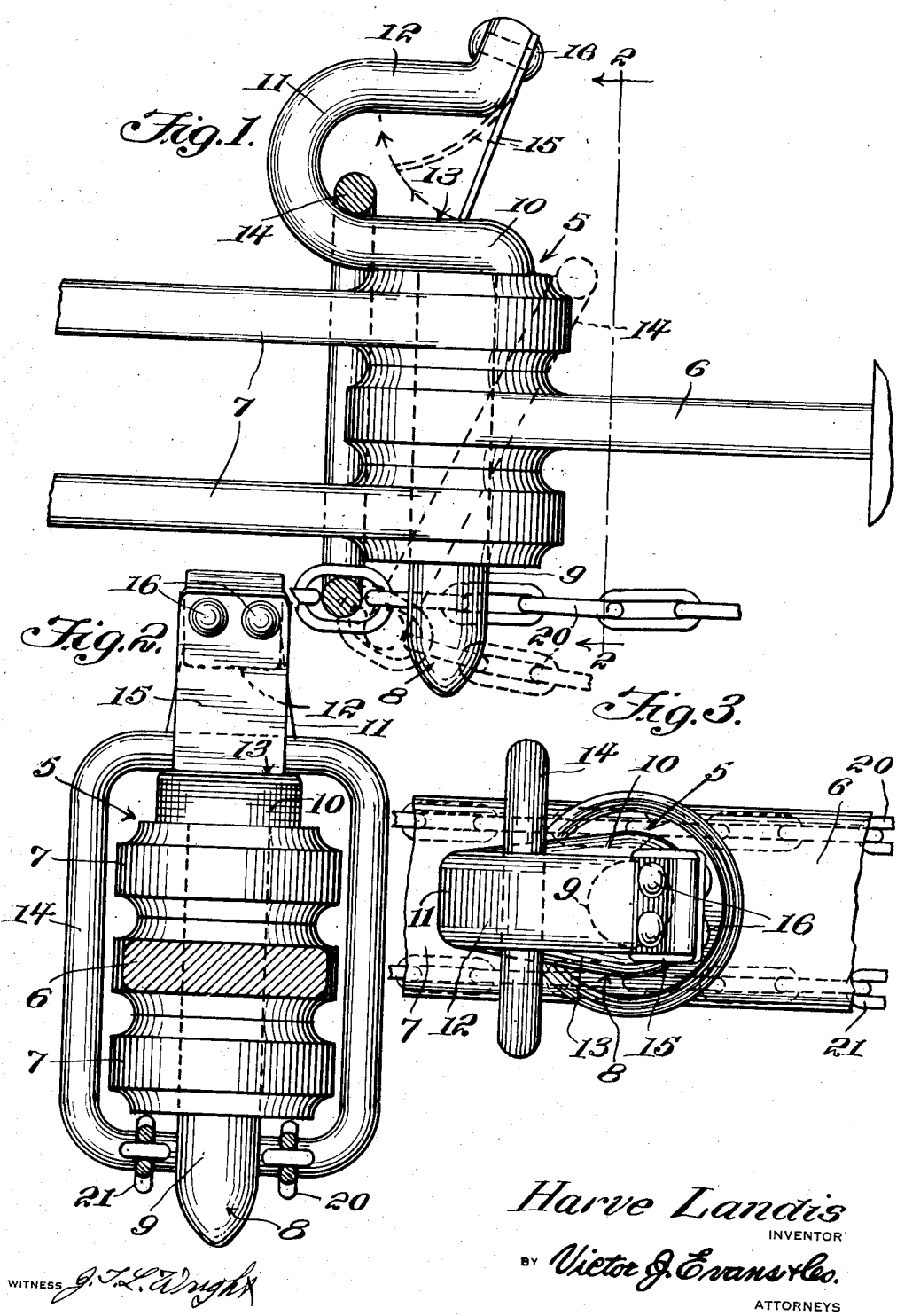

2,158,941

UNITED STATES PATENT OFFICE 2,158,941

COUPLING PIN

Harve Landis, Walters, Okla.

Application July 22, 1938, Serial No. 220,752

3 Claims. (Cl. 280—33.15)

My invention relates to coupling pins and more particularly to coupling pins equipped with latching means for maintaining the same in position within a coupling.

One of the principal objects of my invention is to provide a coupling pin equipped with means for maintaining the same in securing position within a coupling, thereby preventing accidental dislodgement of the pin therefrom and subsequent uncoupling of the coupling members.

Another object of my invention is to provide a device of the above described character which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a side elevation of a coupling illustrating my invention applied thereto.

Figure 2 is a sectional view taken on the line 2—2 of Figure 1.

Figure 3 is a top plan view of the device.

In teaching my invention there is illustrated a coupling 5 comprising coupling members 6 and 7, the member 6 constituting a draw bar adapted to be secured to a tow vehicle and the member 7 constituting a bifurcated tongue adapted to be secured to a trailer. While the coupling herein illustrated and described is adaptable for use in connection with motor vehicles and trailers, it is to be distinctly understood that other types of couplings may be employed and my improved form of safety coupling pin utilized in connection therewith.

The coupling illustrated is of a typical construction and the members thereof are fashioned with registering openings which receive my improved coupling pin 8 whereby the members are secured together in coupled relation. The coupling pin 8 comprises a shank portion 9 inserted within the members 6 and 7 and is fashioned with a head 10 formed with a fold 11 providing a section 12 overlying the top face 13 of the head. Mounted within the fold 11 is a link 14, the lower section of which is adapted to embrace the member 7 to prevent withdrawal of the shank 9 from the coupling.

Secured to the end of the section 12 is a latch member or resilient spring 15 extending downwardly and inwardly and engages the top face 13 of the head. The upper end of said spring is secured to the section 12 by means of rivets 16. Said latch or spring 15 resiliently engages the top face 13 to close the respective end of the fold 11 and prevent dislodgement of the link therefrom. The lower end of the shank 9 coacts therewith to maintain the link in adjusted position relative to the coupling members.

In the position of the parts as illustrated in Figure 1 the link 14 embraces the coupling members on the side from which the member 7 extends from the trailer and is maintained in said position by means of the latch 15 and lower end of the shank 9. To effect a withdrawal of the pin 8 for uncoupling the members 6 and 7, the latch or spring 15 is manually moved towards the link 14 to the position illustrated in dotted lines in Figure 1. When the latch is thus moved, the upper section of the link 14 may be withdrawn from the fold 11 to the position illustrated in dotted lines in Figure 1. In this position of the parts the pin 8 may be withdrawn from the members to effect the uncoupling thereof.

Inasmuch as many State laws are mandatory in providing that trailers and tow vehicles be connected together with auxiliary means other than the main coupling means, I provide chains 20 and 21 secured to the trailer and tow vehicle respectively. The chains are connected together and to the link 14 thereby establishing an auxiliary connection between the trailer and tow vehicle for compliance with any State law requiring the same.

From the foregoing it will be apparent that I have provided a simple and efficient structure whereby a coupling pin may be effectively locked to the coupling against accidental dislodgement therefrom.

What I claim is:

1. A pin adapted for securing coupling members together and fashioned with a head having a fold forming a section overlying the top face of said head, a link mounted within said fold and adapted for engagement with one of said coupling members to prevent removal of said pin from said members, and a latch member secured to said section and coacting with the top face of said pin to prevent dislodgement of said link from said fold.

2. A device of the character described, comprising, a pin adapted for securing coupling members together and fashioned with a head having a fold forming an offset section overlying the top face of said head, a link mounted within said fold and adapted for engagement with one of said coupling members to prevent removal of said pin from said members, and a resilient latch member secured to said offset section and engaging the top face of said head whereby said latch coacts with the lower end of said pin to prevent dislodgement of said link from said pin.

3. A device of the character described, comprising, in combination, a pair of coupling members adapted for coupling a tow vehicle and trailer together, a pin insertable within said members for maintaining the same in coupled relation, said pin fashioned with a hook on one end thereof, a link embracing said coupling members and engageable within said hook for maintaining said pin in said members, a spring carried by said hook and coacting with said pin for maintaining said link in said hook and in adjusted position about said members, said spring manually movable to permit withdrawal of said link from said hook and withdrawal of said pin from said members to effect uncoupling of said members.

HARVE LANDIS.